Figure 1:
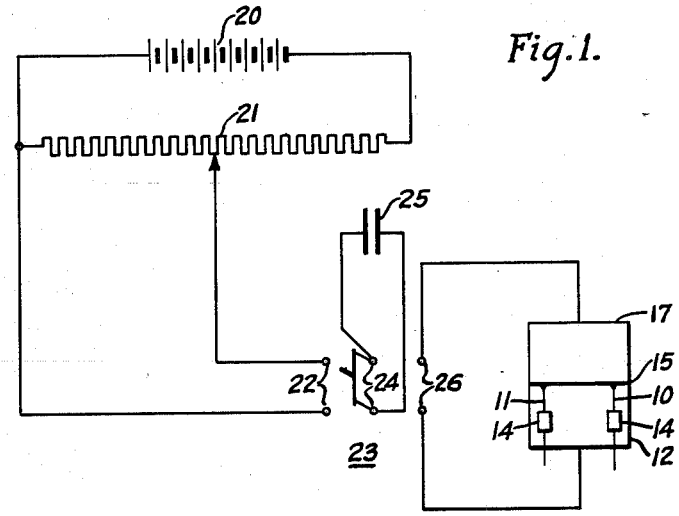

Aug. 11, 1936.    R. N. STODDARD    2,050,393
WELDING METHOD AND APPARATUS
Filed Nov. 8, 1934

WITNESSES:
INVENTOR
Ralph N. Stoddard
ATTORNEY

Patented Aug. 11, 1936

2,050,393

UNITED STATES PATENT OFFICE 2,050,393

WELDING METHOD AND APPARATUS

Ralph N. Stoddard, Pittsburgh, Pa., assignor to Westinghouse Electric & Manufacturing Company, East Pittsburgh, Pa., a corporation of Pennsylvania Application November 8, 1934, Serial No. 752,052

14 Claims. (Cl. 219—4)

My invention relates, generally, to welding, and it has particular relation to electrical percussive welding.

In the past, when attempts have been made to weld together wires of relatively small diameter, such as .001 inch, or less, considerable difficulty has been encountered. One use of wires of this diameter is in the construction of thermo-couples which are used for measuring minute quantities of current flow for both direct and alternating-current circuits. For this purpose, it is desirable to weld together a pair of wires formed of dissimilar metals and to provide a very good joint therebetween. While the description of this invention is specifically set forth as being applicable to the welding together of small diameter wires for thermo-couples, it will be readily apparent that it may be practiced in the welding together of wires having small diameter for other applications.

The difficulty which has been encountered in the welding together of small diameter wires is due to the fact that sufficient metal is not present to withstand the welding heat and pressure. When the wires are positioned between the jaws of even a very small welding machine, it has not been possible to regulate the pressure which is applied to the joint, so that the wires will not be crushed when the weld-point or intersection of the wires becomes fluid, due to the heating effect of the current. This difficulty will be more readily perceived when it is understood that a wire having a diameter of one thousandth of an inch is about the same diameter as a human hair. It will then be understood that the application of too great pressure to the weld-point will ordinarily crush the wires, while if too little pressure is applied, good fusion does not result.

In the manufacture of thermo-couples in which wires of small diameter are joined together, the shrinkage factor has been exceptionally high. In some instances, it has been in the neighborhood of seventy-five percent. That is, out of every four sets of wires, which the operator attempted to weld together, only one perfect weld resulted. Furthermore, the process has been slow and laborious, thereby not only increasing the cost of the final product, due to the scrap material which was produced when the methods of the prior art were used, but also the labor cost was very high. Although perfect welds apparently were obtained after considerable trial and error, it has been found in many instances on assembly in a meter or the like, that the wires came apart at the weld-point.

In view of the foregoing, therefore, the object of my invention, generally stated, is to provide apparatus for welding together pairs of small diameter wires which shall be simple and efficient in operation, and which may be readily and economically manufactured and installed.

The principal object of my invention is to provide for welding together wires of small diameter.

Another important object of my invention is to provide for applying welding current and a limited pressure to a weld-point, at which a pair of wires of small diameter are to be welded.

Another object of my invention is to provide for concentrating welding current at the junction of a pair of wires of small diameter and applying thereto simultaneously, a limited pressure to form a percussive weld.

Other objects of my invention will, in part, be obvious and, in part, appear hereinafter.

My invention, accordingly, is disclosed in the embodiment hereof shown in the accompanying drawing, and comprises the features of construction, combination of elements, and arrangement of parts, which will be exemplified in the construction hereinafter set forth, and the scope of the application of which will be indicated in the appended claims.

Figure 2:
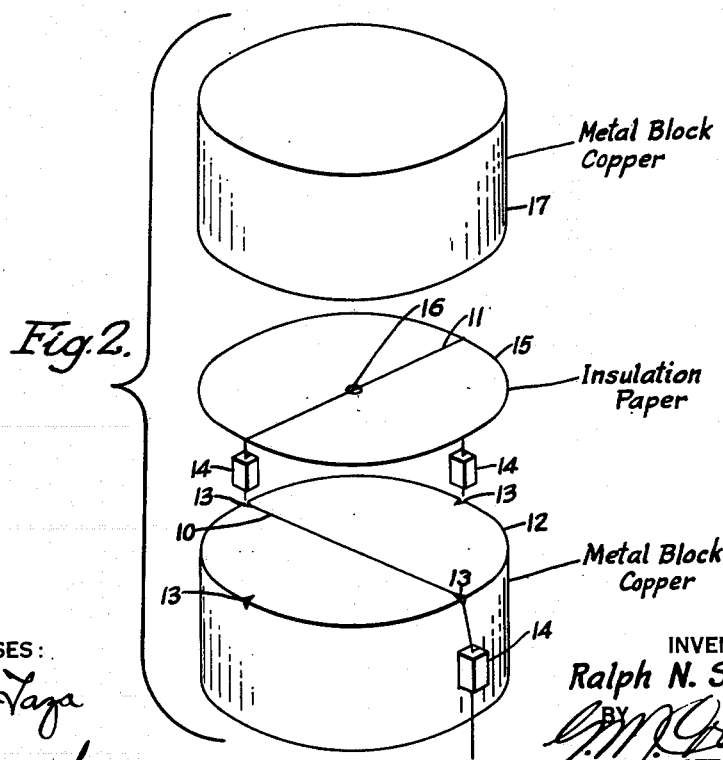

For a more complete understanding of the nature and scope of my invention, reference may be had to the following detailed description, taken in connection with the accompanying drawing, in which:

Figure 1 illustrates diagrammatically the operating system which may be employed in practicing my invention; and Fig. 2 is an exploded, perspective view of a concrete embodiment of my invention.

In order to weld together a pair of wires of small diameter in accordance with my invention, each of them is positioned in contact engagement with a welding electrode. The wires are so arranged as to intersect at a point which preferably is centrally located with respect to the electrodes, and an insulating medium, such as paper, having a small aperture is positioned therebetween. The thickness of the paper is slightly less than the diameter of the smaller of the two wires, and the paper itself is of sufficient extent so as to entirely insulate the electrodes and wires from each other except as the wires are permitted to come into engagement through the aperture.

After the foregoing assembly has been made, the terminals of a charged capacitor are connected across the welding electrodes, and the discharge therefrom is concentrated at the aperture, and at the intersection of the wires. Due to the fact that the thickness of the insulating paper is slightly less than the diameter of the smaller of the two wires if one of the wires is smaller than the other, a slight movement of the upper electrode is permitted, that is sufficient to apply the required degree of pressure at the weld-point, which is the intersection between the wires, so that proper fusion results therebetween. The pair of wires, which are now welded together, may be removed from the insulating paper and the process repeated.

Referring now particularly to Fig. 2 of the drawing, the reference characters 10 and 11 designate each of a pair of wires which are to be welded together. The wires 10 and 11 may have a diameter of approximately .001 inch, and may be composed of suitable metals for the formation of a thermo-couple. The wire 10, as illustrated, may be laid across a lower electrode 12, which may be a metal block preferably composed of copper. The wire 10 is positioned across a diameter of the block 12 and in notches 13, where it is secured by means of weights 14 or any other suitable means.

An insulating medium, which preferably comprises a thin sheet of paper 15, is positioned on top of the lower electrode 12 and also on top of the wire 10. The insulating paper 15 is provided with a centrally located aperture 16 which is aligned with the wire 10. The thickness of the insulating paper 15 is slightly less than the diameter of the smaller of the two wires 10 and 11 for a purpose which will be set forth hereinafter.

The other wire 11 may then be positioned on top of the insulating paper 15, and also secured in position by means of the weights 14. The wire 11 is also aligned with the aperture 16, so that the wires 10 and 11 may come into contact engagement at their intersection. In positioning the wire 11, care must be taken to properly insulate it from the lower electrode 12 and this may be accomplished by providing the insulating paper 15 with a sufficiently large area, so that no part of the wire 11 or the weights 14 attached thereto, is permitted to come into contact engagement with the lower electrode 12.

An upper electrode 17, comprising another metal block, which is preferably composed of copper, is then positioned on top of the wire 11 and the insulating paper 15.

The weight of the upper electrode 17 should be so proportioned that its downward movement will apply the proper forging action at the weld-point. If it is too heavy, its inertia will prevent its movement sufficiently quickly enough to apply the forging action while the weld-point is heated. On the other hand, if the upper electrode is too light, a sufficient forging action will not be applied.

With the assembly as described hereinbefore, the maximum spacing between the lower and upper electrodes 12 and 17 occurs at the intersection of the wires 10 and 11, where they are to be welded together. Due to the fact that the insulating paper 15 is of a thickness which is less than the diameter of the smaller of the two wires 10 and 11, the upper electrode 17 is permitted to move slightly when the weld-point is heated, in order to provide a slight forging or percussive action at the weld-point to insure proper fusion.

In order to weld together wires having a diameter of .001 inch, I have employed a sheet of paper having a thickness of .0007 inch, which leaves a margin of .0003 inch through which the upper electrode 17 may move. However, its further movement is limited due to the remaining thickness of the insulating paper 15, and there is no likelihood that the wires 10 and 11 will be crushed at the weld-point, due to the application of excessive pressure. On the other hand, sufficient pressure is applied to cause the proper degree of fusion.

Referring now particularly to Fig. 1 of the drawing, it will be observed that a circuit is there shown for applying current to the welding electrodes 12 and 17. While the particular circuit shown in Fig. 1 is preferable for applying a welding current, it will be readily understood that other circuits may be employed without departing from the scope of this invention.

In order to provide the required welding current, a battery 20 is connected across a potentiometer 21, the terminals of which are connected to the terminals 22 of a double-pole, double-throw switch, shown generally at 23. The center terminals 24 of the switch 23 are connected across a capacitor 25, which will be charged to a potential depending upon the setting of the potentiometer 21. The remaining terminals 26 of the switch 23 are connected, as illustrated, across the welding electrodes 12 and 17.

When the switch 23 is operated to connect the terminals 22 to the terminals 24, the capacitor 25 is charged to a value which is determined by the voltage of the battery 20, and the setting of the potentiometer 21. I have found that it is desirable to provide the capacitor 25 having a capacity of 55 microfarads, and to charge it to a potential of 35 volts. These values, however, are used merely for illustrative purposes, and it will be readily understood that other values of capacity and voltage may be employed in practicing my invention.

When the switch 23 is operated to connect the terminals 24 to the terminals 26, the capacitor 25 is directly connected across the electrodes 12 and 17. Since the electrodes 12 and 17 are insulated from each other, except for the conducting path through the aperture 16, the entire discharge of the capacitor 25 passes through it, and through the weld-point which is formed at the intersection of the wires 10 and 11. Due to the heating effect of the passage of welding current, the wires 10 and 11 become slightly fluid at the weld-point, thereby permitting the upper electrode 17 to move downwardly to provide the slight forging or percussive effect which is desirable for insuring proper fusion.

After the foregoing sequence of operations has been performed, the switch 23 may be operated to again charge the capacitor 25. The upper electrode 17 may then be removed and the wires 10 and 11, which are now welded together, may be withdrawn from the insulating paper 15. Since wires of the diameter which it is intended to be welded in accordance with this invention are very flexible, it is posssible to withdraw one of them through the aperture 16, without any difficulty.

It is desired to store or ship the completed thermo-couple, the insulating paper 15 may be left between the wires 10 and 11 in order to provide a suitable support for them.

While in the foregoing description and in the drawing, the lower electrode 12 has been illustrated as being similar to the upper electrode 17, it will be readily understood that this construction is not essential. The lower electrode 12 may be of any suitable shape on which the wire 10 may be secured. It is desirable, however, to provide the upper electrode 17 having a considerable mass, in order to provide the proper forging or percussive effect. Moreover, while the electrodes 12 and 17 have been illustrated and described as being composed of copper, it will be understood that any other suitable similar metal may be employed. Also, any other insulating medium may be used instead of the insulating paper 15. However, the foregoing materials are inexpensive and relatively easy to obtain, and for that reason, the invention has been particularly set forth by specifying that these materials have been used.

Since certain further modifications may be made in the above construction, and different embodiments of the invention may be made, without departing from the scope thereof, it is intended that all matter contained in the above description, or shown in the accompanying drawing, shall be interpreted as illustrative and not in a limiting sense.

I claim as my invention:

1. Apparatus for welding together wires having a diameter of the order of .001 inch and the like comprising, in combination, a pair of metallic electrodes for individual engagement with each of a pair of wires to be welded together, insulating means having a thickness less than the diameter of the smaller of said wires and provided with an aperture and disposed to be positioned between said wires with the aperture coinciding with the junction between the wires, and means for passing welding current between said electrodes and through said aperture to effect a weld at the junction of the wires.

2. Apparatus for welding together wires of small diameter and the like comprising, in combination, a pair of metallic electrodes for individual engagement with each of a pair of wires to be welded together at a weld-point, said electrodes being positioned one on top of the other and the upper electrode being of such weight as to produce a forging action at the weld-point, insulating means provided with an aperture disposed to coincide with the weld-point and positioned between said wires, and means for passing welding current between said electrodes and through said aperture to effect a weld at the weld-point.

3. Apparatus for welding together wires of small diameter and the like comprising, in combination, a pair of metallic electrodes for individual engagement with each of a pair of wires to be welded together at a weld-point, said electrodes being positioned one on top of the other and the upper electrode being of such weight as to produce a forging action at the weld-point, an insulating member having a thickness less than the diameter of the smaller wire positioned between said wires, said insulating member having an aperture coinciding with the weld-point, and means for passing welding current between said electrodes and through said aperture to effect a weld at the weld-point.

4. Apparatus for welding together wires having a diameter of the order of .001 inch and the like comprising, in combination, upper and lower metallic electrodes between which the wires to be welded together intersect at a weld-point, insulating means having a thickness less than the diameter of the smaller of said wires and provided with an aperture disposed to coincide with the weld-point and positioned between said wires, and means for passing welding current between said electrodes and through said aperture to effect a weld at the weld-point.

5. Apparatus for welding together wires of small diameter and the like comprising, in combination, upper and lower metallic electrodes between which the wires to be welded together intersect at a weld-point, insulating means having a thickness less than the diameter of the smaller wire positioned between said wires, said insulating member having an aperture coinciding with the weld-point, and means for passing welding current between said electrodes and through said aperture to effect a weld at the weld-point.

6. Apparatus for welding together wires having a diameter of the order of .001 inch and the like comprising, in combination, upper and lower metallic electrodes between which the wires to be welded together intersect at a weld-point, an insulating paper having a thickness less than the diameter of the smaller of said wires and provided with an aperture disposed to coincide with the weld-point and positioned between said wires, and means for connecting a charged capacitor to said electrodes for discharging the same through said aperture to effect a weld at the weld point.

7. The method of welding together a pair of intersecting wires of small diameter which comprises positioning the wires in insulated spaced relation except for the point of intersection and percussively welding the wires at the point of intersection.

8. The method of welding together a pair of intersecting wires of small diameter which comprises positioning the wires in insulated spaced relationship except for the point of intersection between a pair of electrodes located one above the other and connecting a charged capacitor across said electrodes to be discharged through the point of intersection of the wires thereby percussively welding the wires together.

9. The method of welding together a pair of wires of small diameter which comprises positioning one of the wires on a welding electrode, positioning an insulating sheet on said one wire having an aperture aligned therewith, positioning the other of the wires on said sheet in alignment with said aperture, placing a second welding electrode on said other wire, and connecting a charged capacitor across said electrodes to be discharged through said aperture thereby percussively welding said wires together.

10. Apparatus for welding together a plurality of stacked metallic members comprising, in combination, upper and lower electrodes composed of conducting material and disposed to individually engage the outside members of the stacked metallic members, insulating means interposed between said metallic members and having an aperture to permit contact engagement therebetween within a restricted zone, and means for causing welding current to flow between said electrodes through said metallic members within said restricted zone, said upper electrode being of such weight as to produce a forging action between said metallic members within said restricted zone on flow of welding current.

11. Apparatus for welding together a pair of metallic members comprising, in combination, upper and lower electrodes composed of conducting material and disposed to individually engage said metallic members, insulating means interposed between said metallic members and provided with an opening therethrough to permit contact engagement between said metallic members within a restricted area to form a weld-point, and means for causing welding current to flow between said electrodes through said metallic members at said weld-point, said upper electrode being of such weight as to produce a forging action between said metallic members at said weld-point on flow of welding current.

12. Apparatus for welding together wires of small diameter and the like comprising, in combination, upper and lower electrodes composed of conducting material between which the wires to be welded together intersect at a weld-point, insulating means positioned between said wires and having an aperture coinciding with said weld-point, and means for causing welding current to flow between said electrodes through said weld-point, said upper electrode being of such weight as to produce a forging action between said wires at said weld-point on flow of welding current.

13. Apparatus for welding together wires of small diameter and the like comprising, in combination, upper and lower electrodes composed of conducting material between which the wires to be welded together intersect at a weld-point, means for maintaining said electrodes in insulated spaced relation except as they are interconnected at said weld-point, and means for causing welding current to flow between said electrodes through said weld-point, said upper electrode being of such weight as to produce a forging action at said weld-point on flow of welding current.

14. Apparatus for welding together a pair of metallic members comprising, in combination, upper and lower electrodes composed of conducting material between which the metallic members to be welded together engage at a weld-point, means for maintaining said electrodes in insulated spaced relation except as they are interconnected at said weld-point, and means for causing welding current to flow between said electrodes through said weld-point, said upper electrode being of such weight as to produce a forging action at said weld-point on flow of welding current.

RALPH N. STODDARD.